(12) United States Patent
Tucker, Jr.

(10) Patent No.: US 7,201,242 B2
(45) Date of Patent: Apr. 10, 2007

(54) TRACKED VEHICLE WITH IMPROVED TRACK DRIVE UNIT

(75) Inventor: Jasper J. Tucker, Jr., Medford, OR (US)

(73) Assignee: Tucker Sno-Cat Corporation, Medford, OR (US)

( * ) Notice: Subject to any disclaimer, the term of this patent is extended or adjusted under 35 U.S.C. 154(b) by 0 days.

(21) Appl. No.: 10/956,952

(22) Filed: Oct. 1, 2004

(65) Prior Publication Data

US 2005/0072607 A1 Apr. 7, 2005

Related U.S. Application Data

(62) Division of application No. 10/666,028, filed on Sep. 17, 2003, now Pat. No. 6,983,812.

(51) Int. Cl.
*B62D 55/00* (2006.01)
(52) U.S. Cl. .................. 180/9.3; 180/9.1; 305/136
(58) Field of Classification Search .............. 180/9.1, 180/9, 9.26, 9.28, 9.3, 9.62, 9.64; 305/136, 305/124, 142, 130, 132
See application file for complete search history.

(56) References Cited

U.S. PATENT DOCUMENTS

| 3,924,905 | A | | 12/1975 | Simmons |
|---|---|---|---|---|
| 3,938,606 | A | | 2/1976 | Yancey |
| 3,997,217 | A | | 12/1976 | Bandet et al. |
| 4,072,203 | A | | 2/1978 | Pierson |
| 4,116,496 | A | | 9/1978 | Scott |
| 4,218,932 | A | | 8/1980 | McComber |
| 4,483,407 | A | * | 11/1984 | Iwamoto et al. ............. 180/9.5 |
| 4,696,520 | A | | 9/1987 | Henke et al. |
| 4,961,395 | A | | 10/1990 | Coast |
| 5,161,866 | A | | 11/1992 | Johnson |
| 5,286,044 | A | * | 2/1994 | Satzler et al. ............. 280/28.5 |
| 5,312,176 | A | | 5/1994 | Crabb |
| 5,343,960 | A | | 9/1994 | Gilbert |
| 5,358,064 | A | | 10/1994 | Oertley |
| 5,368,115 | A | * | 11/1994 | Crabb ........................ 180/9.1 |
| 5,373,909 | A | * | 12/1994 | Dow et al. .................. 180/9.1 |
| 5,409,075 | A | | 4/1995 | Nieman |

(Continued)

FOREIGN PATENT DOCUMENTS

CA 976213 10/1975

(Continued)

*Primary Examiner*—Lesley D. Morris
*Assistant Examiner*—L Lum
(74) *Attorney, Agent, or Firm*—Klarquist Sparkman, LLP

(57) ABSTRACT

An all-terrain vehicle is supported and driven by endless track units. Each track unit includes a drive belt with rows of interior drive lugs driven by cogs on multiple sprocket wheels of a common drive wheel assembly having an integrated, one-piece drum and hub. Multiple guide wheel assemblies engaging the lower run of the drive belt distribute the vehicle load across substantially the full width of the belt. Each guide wheel assembly includes a pair of guide wheel units mounted on opposite end portions of a common spindle and on opposite sides of a carrier beam of the track unit. Each guide wheel unit has a wide belt-engaging surface extending to, or close to, an edge portion of the belt and interrupted by an annular groove permitting passage of a row of the belt drive lugs while maintaining alignment of the belt and drive wheel assembly.

37 Claims, 9 Drawing Sheets

U.S. PATENT DOCUMENTS

| | | | |
|---|---|---|---|
| 5,749,423 A | 5/1998 | Burckhartzmeyer | |
| 5,855,421 A | 1/1999 | Kautsch | |
| 5,954,148 A * | 9/1999 | Okumura et al. | 180/9.21 |
| 6,007,166 A | 12/1999 | Tucker et al. | |
| 6,047,785 A * | 4/2000 | Snyder et al. | 180/9.1 |
| 6,086,169 A * | 7/2000 | Keehner | 305/137 |
| 6,129,426 A | 10/2000 | Tucker | |
| 6,318,484 B2 * | 11/2001 | Lykken et al. | 180/9.48 |
| 6,401,847 B1 * | 6/2002 | Lykken | 180/9.1 |
| 6,869,153 B2 * | 3/2005 | Wright et al. | 305/169 |
| 6,983,812 B2 * | 1/2006 | Tucker | 180/9.3 |

FOREIGN PATENT DOCUMENTS

| | | |
|---|---|---|
| DE | 3413321 | 10/1985 |
| JP | 55-39838 | 3/1980 |
| JP | 6-64568 | 3/1994 |

* cited by examiner

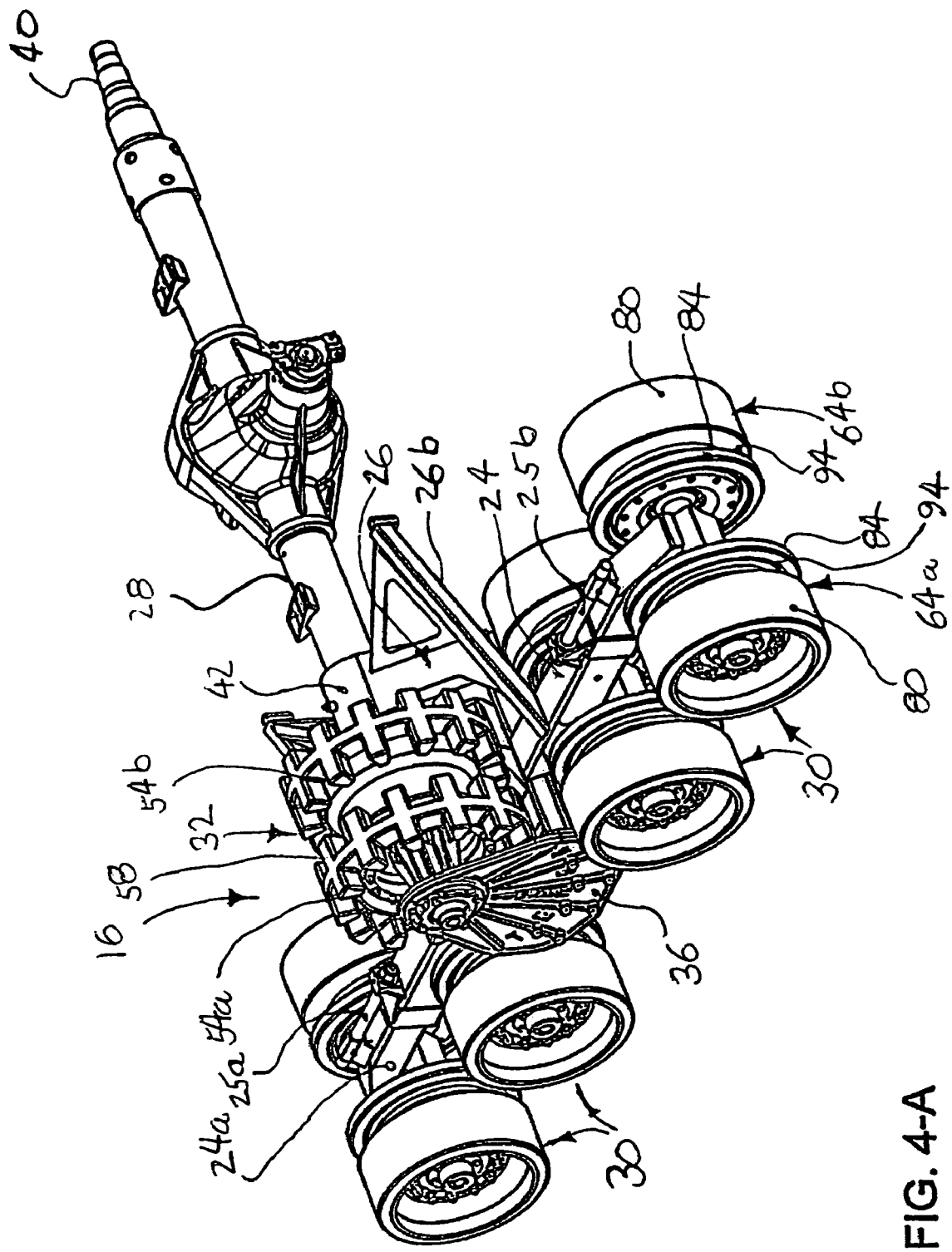
FIG. 4-A

TRACKED VEHICLE WITH IMPROVED TRACK DRIVE UNIT

CROSS REFERENCE TO RELATED APPLICATIONS

This application is a divisional application of U.S. patent application Ser. No. 10/666,028, filed Sep. 17, 2003 now U.S. Pat. No. 6,983,812, which is incorporated herein by reference.

FIELD OF THE INVENTION

The present invention relates to all-terrain tracked vehicles, and more particularly to an improved endless drive track unit for such tracked vehicles.

BACKGROUND OF THE INVENTION

Endless track-driven vehicles are commonly used off-road in difficult terrain and under difficult terrain conditions, such as in mud, snow, sand, and tundra. For example, tracked vehicles are used in snow country for grooming ski slopes and snow mobile trails, for transporting skiers to back-country slopes, for ski resort maintenance work, and for snow and mountain rescue. They are also used in various types of terrain for utility company maintenance work, and for oil exploration and oil pipeline maintenance in arctic tundra.

Tracked vehicles are generally of two types. Many are two-tracked in which a pair of endless drive track units, one on each of the opposite sides of the vehicle, support and drive the vehicle. Others are four-tracked, in which four separately driven and independently suspended drive track units, two in front and two in the rear, support and drive the vehicle.

Four-tracked vehicles have certain advantages over two-tracked vehicles under extreme conditions such as on steep slopes and in very rough terrain because of the flexible independent suspensions of the track drive units and the constant power available to all of the track drive units, even while turning. Unlike a two-tracked vehicle which relies on the differential speed of the two tracks for turning, a four-tracked vehicle steers much like a wheeled vehicle. Its endless drive track units can be physically turned for steering.

In many tracked vehicles, such as the four tracked vehicles shown in U.S. Pat. No. 6,007,166, the lower, ground-engaging run of the track has been supported by a plurality of single-element guide wheels disposed substantially inline longitudinally of the track and generally engaging only a centralized region of the track. Although this system, with a single line or row of guide wheels, functioned adequately, it was found that substantial deflection of the track on opposite sides of the guide wheels was occurring. This deflection was caused generally by the high-point loading of the track by the guide wheels at the center of the lateral dimensions of the track. This could lead to premature failure of elements in the track due to high cyclical stresses. This same high-point loading of the track and its consequential deflection could also lead to premature failure of the track and reduce its effective traction. The high-point loading of the track was also transmitted through the track to the underlying terrain. In the case of sensitive terrain such as tundra, such loading could cause excessive damage to the terrain, especially with the endless track usually including traction bars or cleats on its outer surface for enhancing the vehicle's traction.

The drive track unit disclosed in U.S. Pat. No. 6,129,426, addressed the foregoing problems by providing guide wheel assemblies along the lower track run, with each assembly including multiple guide wheels mounted on a common guide wheel hub. This increased the guide wheel surface contact area across the width of the track, thereby reducing point loading of the track and consequential track deflection and wear, as well as terrain damage. Although this was a substantial improvement over the prior art and alleviated the aforementioned problems to some extent, it did not do so altogether. Consequently, some of the track wear and terrain disturbance problems still occurred, especially with all-terrain vehicles that carry heavy loads. Despite there being three separate wheel rims mounted on a common hub, there still remained essentially only a single wheel unit in each such guide wheel assembly, and the surface contact areas of the three rims with the track were still relatively small compared to the overall width of the track. Therefore, each such single three-wheel guide wheel assembly still left extensive outwardly and inwardly extending track surface areas across the width of the track unsupported on the lower track run. Accordingly, substantial track deflection and wear could still occur, as could substantial damage to sensitive terrain underlying the track area.

Another problem with the guide wheel assemblies of the track units of U.S. Pat. No. 6,129,426, was that such guide wheel assemblies were not provided throughout the entire lower track run of the track unit. It was still necessary to include at least one single guide wheel along the lower track run, to provide clearance for the drive wheel assembly of the track unit. Thus, single point loading of the track still occurred along at least a portion of the lower track run.

Furthermore, the drive track units of some prior all-terrain vehicles, especially four-tracked vehicles intended for use on sensitive terrain, have had endless tracks comprising one-piece, endless, molded rubber belts, as disclosed in both of the aforementioned U.S. Pat. Nos. 6,129,426 and 6,007,166, each with rows of inwardly extending hard rubber drive lugs positioned on the inner circumference of the belt. These lugs engaged and meshed with drive cogs on a drive sprocket wheel assembly of the drive track unit. Heretofore, such drive sprocket wheel assemblies have been expensive to fabricate and assemble because of their multiple separate parts. Such parts have included separate sprocket wheels bolted to a common sprocket drum, which in turn was bolted to an axle hub. The hub in turn, was bolted to an end flange of the drive axle itself. The resulting drive wheel assembly was also quite heavy and, especially when used in multiples in a four-tracked vehicle, added substantial weight to the vehicle, thereby increasing the loading of its often already heavily loaded drive tracks.

In the past, drive track units with rubber drive belts have also included outer, ground-engaging surfaces with molded hard rubber traction bars or cleats to improve traction. However, such cleats tend to exacerbate the ground disturbance problems arising from point- or concentrated loading of the belts by the guide wheels of such units.

Another problem that can arise with drive track units that support heavy loads and utilize rubber drive belts, is that the belts may stretch or "give" in use especially when high driving forces are applied by a sprocket wheel to the drive lugs of the belt. Such stretch can give rise to so-called track bounce creating heavy vehicle vibrations, or even track jump, where the belt lugs jump from engagement with the sprocket drive cogs, causing the vehicle to lose power.

SUMMARY OF THE INVENTION

There is a need for an improved drive track unit for endless track-driven vehicles, and especially for four-tracked vehicles and such vehicles that carry heavy loads, that will overcome the foregoing problems. It is therefore a general object of the present invention to provide a track-driven vehicle that overcomes the foregoing problems and provides improved traction, improved track wear, and less terrain disturbance than prior such vehicles, especially when carrying heavy loads.

Another object of the invention is to provide an improved drive track unit for an all-terrain vehicle that is especially suited for heavy vehicles, and provides a better load distribution to the drive track than prior such assemblies, thereby reducing track damage and wear, and consequential ground disturbance during use, and improving vehicle traction, while reducing the likelihood of track bounce or track jump.

A further object of the invention is to provide an improved guide wheel assembly for the drive track unit of a tracked vehicle that provides a better load distribution to the drive track than prior such assemblies by mounting separate guide wheel units of the assembly on opposite sides of a carrier beam of the drive track unit, thereby distributing the vehicle load across substantially the full width of the drive track, to reduce drive track damage and wear, and terrain disturbance, and improve vehicle traction.

Another object of the present invention is to provide a novel and improved guide wheel assembly for the drive track unit of a tracked vehicle, with the assembly including drive wheel units that include relatively wide track support surface portions that extend to, or adjacent to, the inner and outer edge portions of the drive track to reduce point-loading of the track, track deflection and wear, and ground disturbance.

Yet another object of the invention is to provide an improved guide wheel unit for a guide wheel assembly of a drive track unit for a tracked vehicle, such guide wheel unit having a relatively wide track-engaging surface provided with an annular groove that allows for the free passage of drive lugs of a supported endless track through such groove, while providing improved guidance of the track along the lower track run.

Another object of the invention is to provide an improved drive track unit for a tracked vehicle, including a series of guide wheel assemblies spaced along the lower track run all of which support and distribute the vehicle load to the drive track across substantially the full width of the track excepting where rows of drive lugs of the track pass the guide wheels of the assemblies.

Another object of the invention is to provide an improved drive sprocket-and-belt drive for a belt-driven drive track unit of an all-terrain vehicle, including an improved drive lug arrangement on the belt and improved drive cog arrangement on the drive sprocket assembly to reduce belt and sprocket wear, reduce the possibility of track bounce and track jump, and improve power transmission from the sprocket wheel assembly to the drive belt.

Another object of the invention is to provide an improved drive track unit for an all-terrain vehicle, including an endless drive belt that is wider and provides better traction with less terrain disturbance than prior such drive belts.

A further object of the invention is to provide an improved drive wheel assembly for the drive track unit of an all-terrain vehicle in which the assembly is of simplified construction, lower cost, and lesser weight than prior such assemblies by providing an integrated one-piece drive axle hub and sprocket drum for connecting multiple drive sprocket wheels to a drive axle of the unit.

The foregoing and other objects, features, and advantages of the invention will become more apparent from the following detailed description which proceeds with reference to the accompanying drawings.

BRIEF DESCRIPTION OF THE DRAWINGS

FIG. 4A is a perspective view similar to FIG. 4, but with the drive belt removed from the drive track unit;

DETAILED DESCRIPTION OF A PREFERRED EMBODIMENT

To provide a comprehensive disclosure without unduly lengthening the specification, applicant incorporates herein by reference the disclosures of U.S. Pat. Nos. 6,129,426, 6,007,166, 3,787,099, and 3,857,616.

Figure 1:
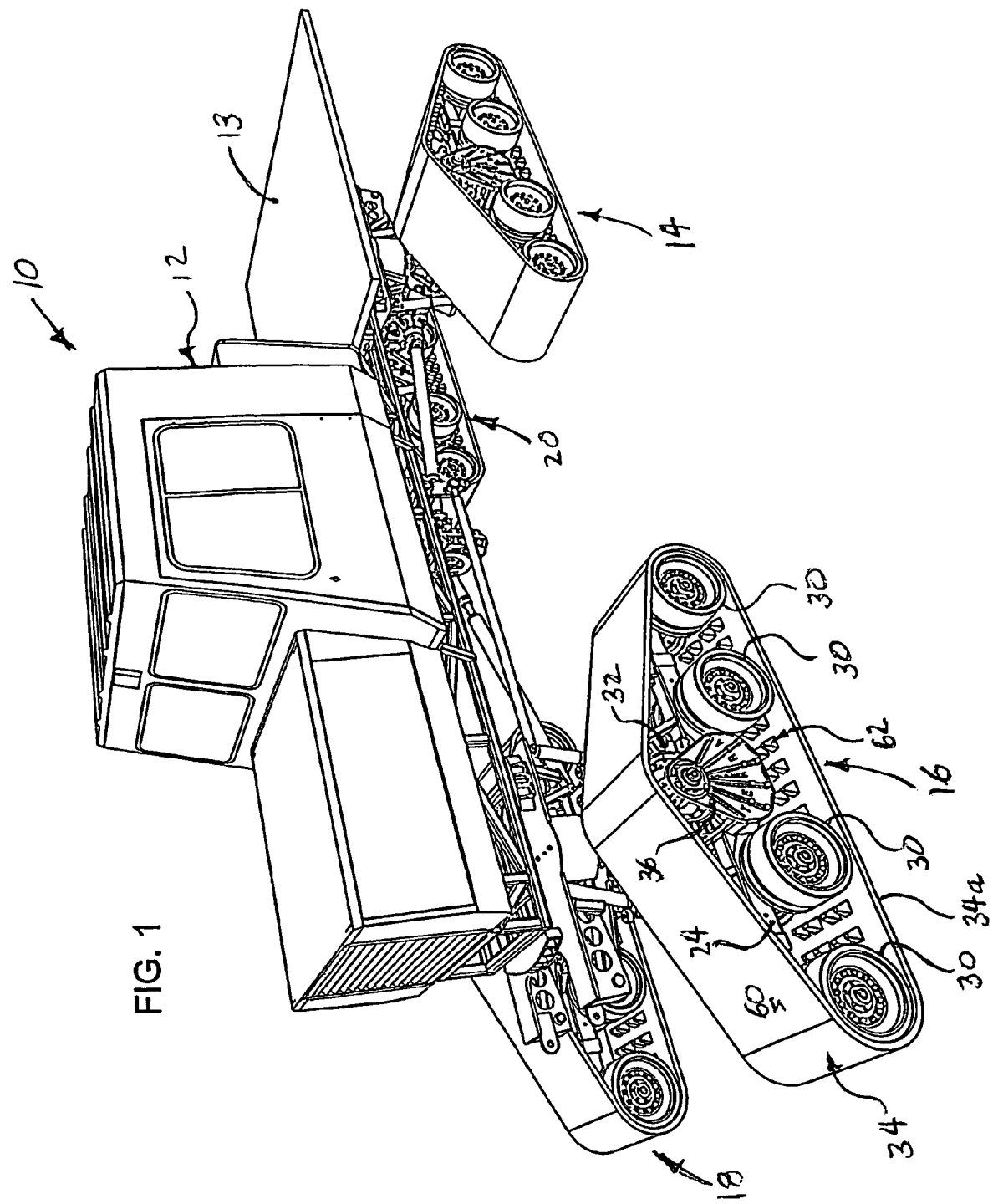
FIG. 1 is a perspective view of a four-tracked, all-terrain vehicle having four separate and independently suspended and driven drive track units, each with an endless drive track, guide wheel assemblies, and a drive wheel assembly in accordance with a preferred embodiment of the invention.

Referring first to FIG. 1, a four-track all-terrain vehicle 10 has a vehicle body 12 supported by four identical endless drive track units 14, 16, 18, and 20, respectively. Track units 14 and 20 are mounted at opposite sides of the rear of the vehicle, and track units 16, 18 are mounted at opposite sides of the front of the vehicle. Each drive track unit is independently mounted, driven, and steerable in a well-known manner. At the forward end of the vehicle, a snow plow, grader blade, or a variety of other attachments (not shown) may be mounted. Similarly, various attachments may be mounted at the rear end of the vehicle, all for multiple operations over a variety of terrain. The particular vehicle shown includes a load platform 13.

Referring to FIGS. 2–6, one of the track units 16 is illustrated in greater detail. The track unit includes a horizontal carrier beam 24 extending lengthwise of the drive track unit and connected to the vehicle body through a frame structure or carrier assembly 26 secured to an axle tube 28 mounted to the chassis of vehicle body 12. A series of four longitudinally spaced-apart guide wheel assemblies 30 and a drive wheel assembly 32 are mounted to support an endless drive track in the form of rubber drive belt 34 in a generally triangular configuration. Drive wheel assembly 32 is mounted at the apex of the triangle, and guide wheel assemblies 30 are spaced apart along the base of the triangle defined by the lower track run 34a of drive belt 34. The four guide wheel assemblies 30 are of identical size and construction and spaced apart along the carrier beam 24 such that none of them interfere with the drive wheel assembly 32 or the carrier assembly 26 that mounts it to the carrier beam.

Figure 2:
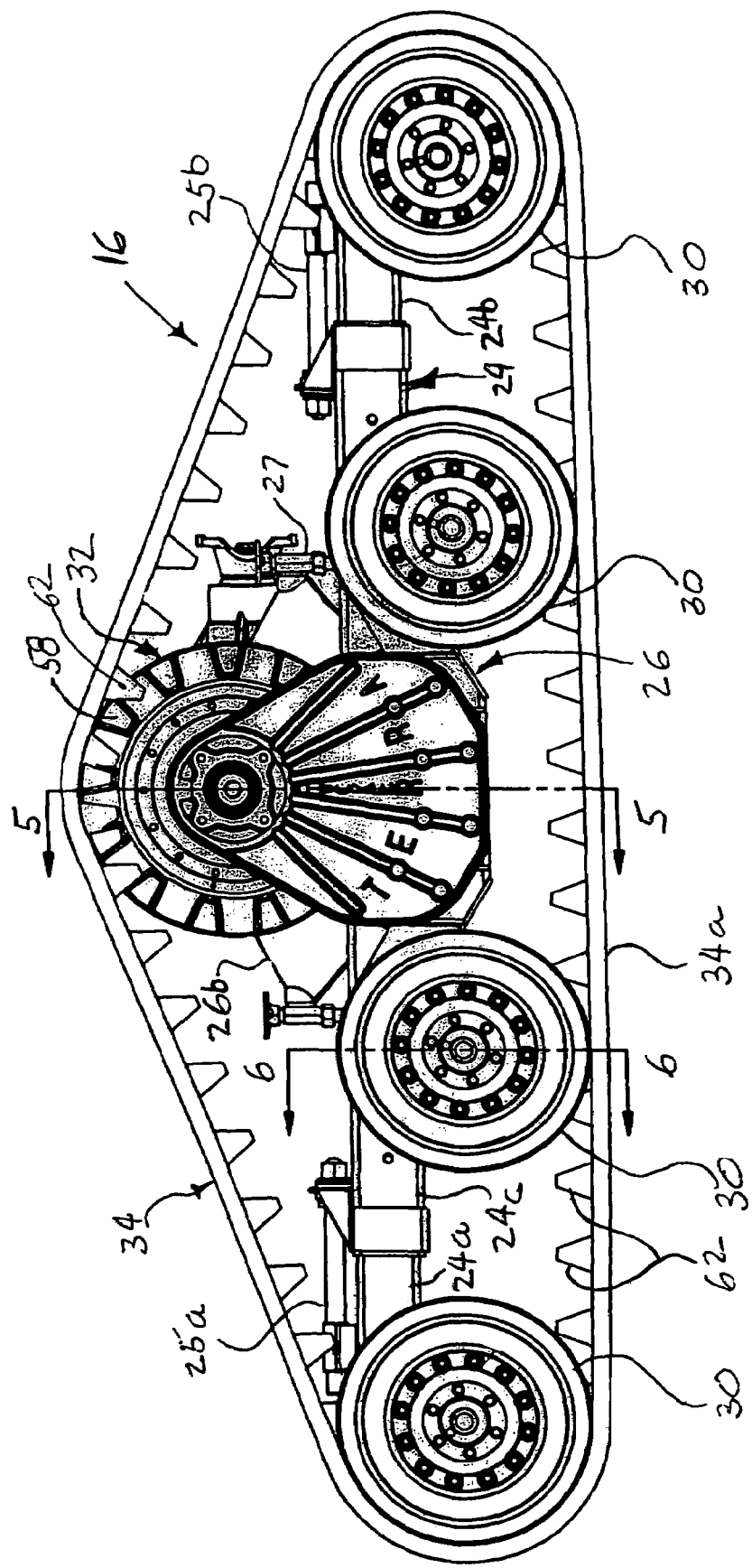
FIG. 2 is an enlarged side elevational view of an endless drive track unit shown in FIG. 1.
Figure 3:
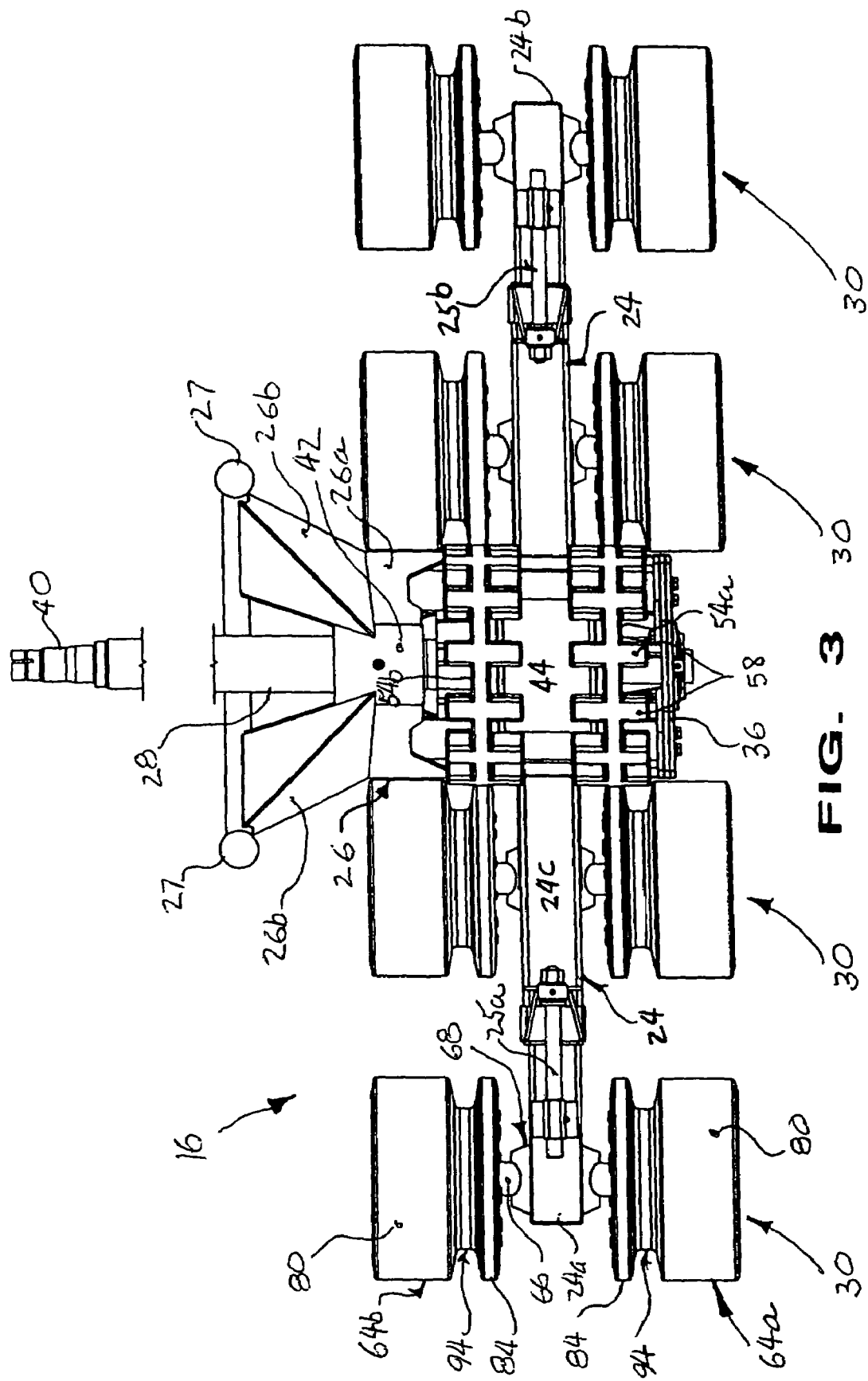
FIG. 3 is a top plan view of the drive track unit of FIG. 2 with the endless drive belt removed.

As shown best in FIGS. 2 and 3, carrier beam 24 includes opposite end portions 24a, 24b that telescope into main carrier beam member 24c. Threaded length adjustment members 25a, 25b interconnect the opposite end portions 24a, 24b, with main carrier beam member 24c to provide for adjustment of the overall length of carrier beam 24. Thus, by adjusting the length of carrier beam 24, the amount of tension applied to the drive belt 34 by the end-most guide wheel assemblies 30 can be adjusted.

Figure 5:
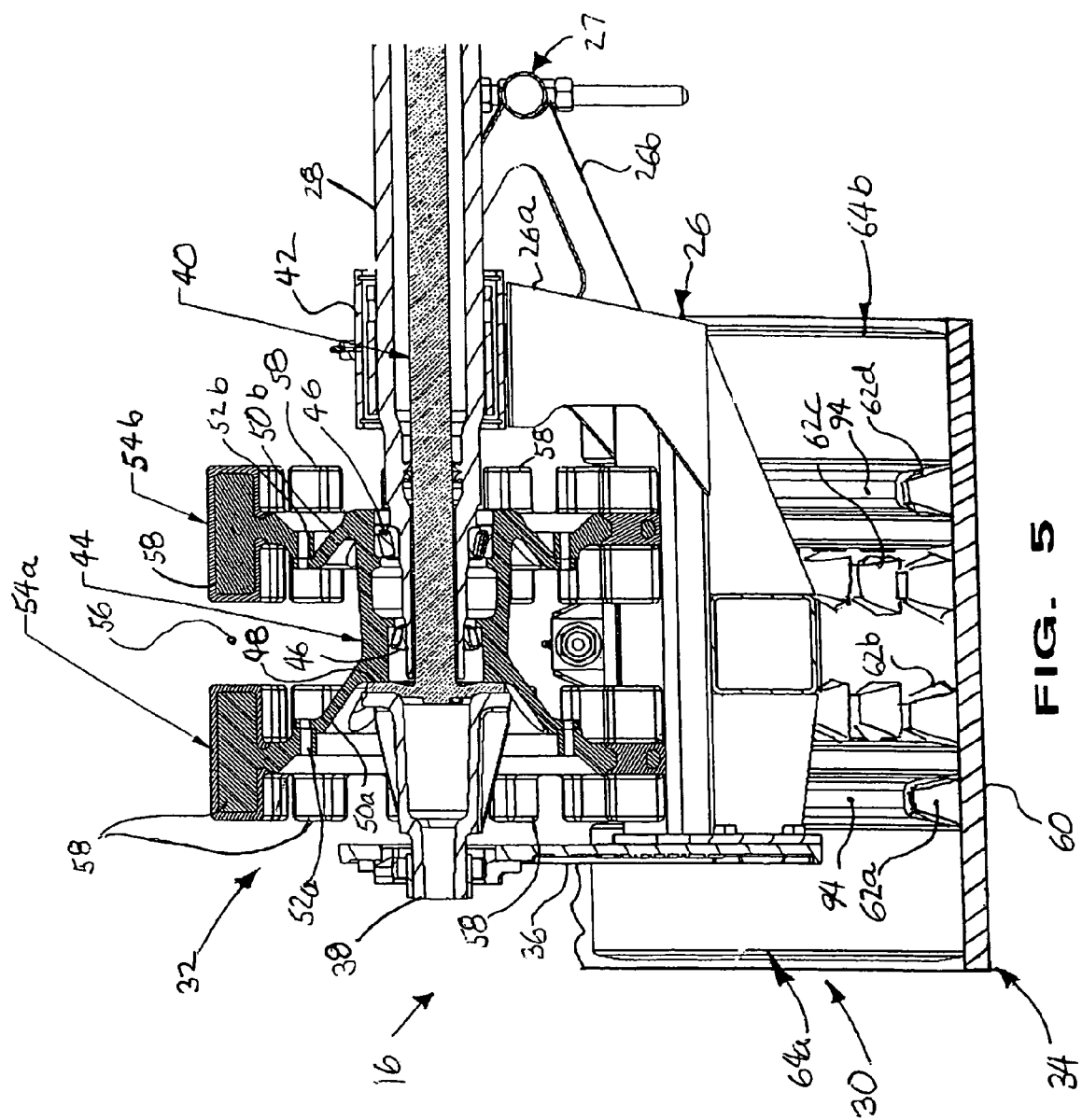
FIG. 5 is a vertical sectional view taken along the line 5—5 of FIG. 2 showing details of the drive wheel assembly and its mounting to the track unit frame.

As shown best in FIGS. 2, 3, and 5, drive wheel assembly 32 is drivingly connected to drive axle shaft 40 and rotatably supported by the outer end portion of axle tube 28. Axle shaft 40 includes an axle shaft extension 38 at its outer end that is rotatably supported by an end plate 36 of the carrier assembly. Axle tube 28 in turn is supported by an upwardly extending portion 26a of carrier assembly 26. An axle tube mounting member 42 secures the axle tube 28 to carrier portion 26a. An outwardly extending portion 26b of carrier assembly 26 includes a threaded adjustment member 27. Together they serve as a carrier stop assembly to limit oscillation of the carrier assembly and thus the drive track unit, about drive axle shaft 40 in a well known manner through engagement with a leaf spring (not shown) on the chassis.

Referring especially to FIG. 5, drive wheel assembly 32 is rotatably driven by the powered axle 40 extending through axle tube 28. Drive wheel assembly 40 includes an integrated one-piece hub-and-sprocket drum 44 rotatably supported on the outer end portion of axle tube 28 by bearings 46. The integrated hub-and-drum 44 is drivingly connected to a flanged end portion 48 of axle shaft 40. Generally radially extending flanged opposite end portions 50, 52 of the integrated hub-and-drum 44 mount a pair of sprocket wheels 54a, 54b in axially spaced apart relationship to form a gap 56 therebetween.

Each sprocket wheel 54a, 54b is bolted to a different one of the integrated hub/drum flanges 50a, 50b by bolted connections at 52a, 52b, respectively, at the inner rims of the sprocket wheels.

Each sprocket wheel 54a, 54b includes a plurality of circumferentially spaced-apart cogs 58 at its outer circumference. In the preferred embodiment, each cog is an integral part of its sprocket wheel and extends laterally inwardly and outwardly from the central disc portion of the wheel. Each laterally extending portion of each cog 58 forms a sprocket tooth for drivingly engaging drive lugs in a row of such lugs on the endless drive belt, as explained further below. The integrated one-piece construction of the hub-and-drum 44 greatly simplifies the construction, manufacture, and assembly of the drive wheel assemblies and their installation in the drive track units, and results in a reduction in the overall weight of the drive track units, and thus the vehicle.

Figure 4:
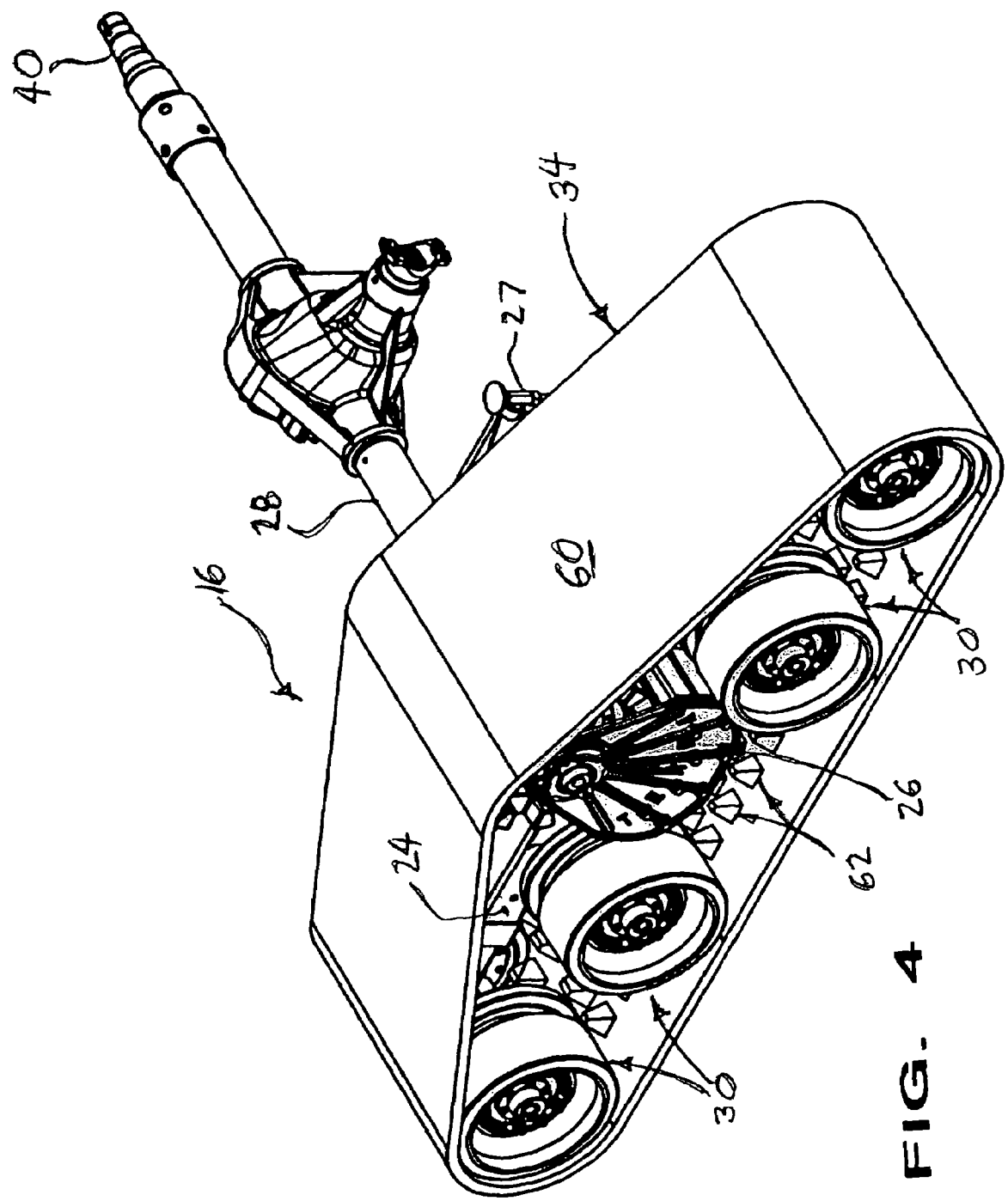
FIG. 4 is a perspective view of the drive track unit of FIG. 2.

Referring to FIGS. 2, 4, and 5, the endless drive belt 34 includes a smooth, flat outer surface 60 to minimize ground disturbance, but has a width that extends across the full width of the guide wheel assemblies 30, as shown best in FIG. 5, to minimize terrain disturbance and yet provide a large surface area contact with the ground and therefore good traction. The inside surface of the belt is provided with four laterally spaced-apart rows of drive lugs 62 including a first row 62a, a second row 62b, a third row 62c, and a fourth row 62d. These lugs are molded in place and preferably constructed of hard rubber. The lugs in each row are circumferentially spaced apart along the inside surface of the belt, and each such row is positioned to be drivingly engaged by a set of drive cogs 58 extending laterally from one side of one of sprocket wheels 54a or 54b.

Figure 5A:
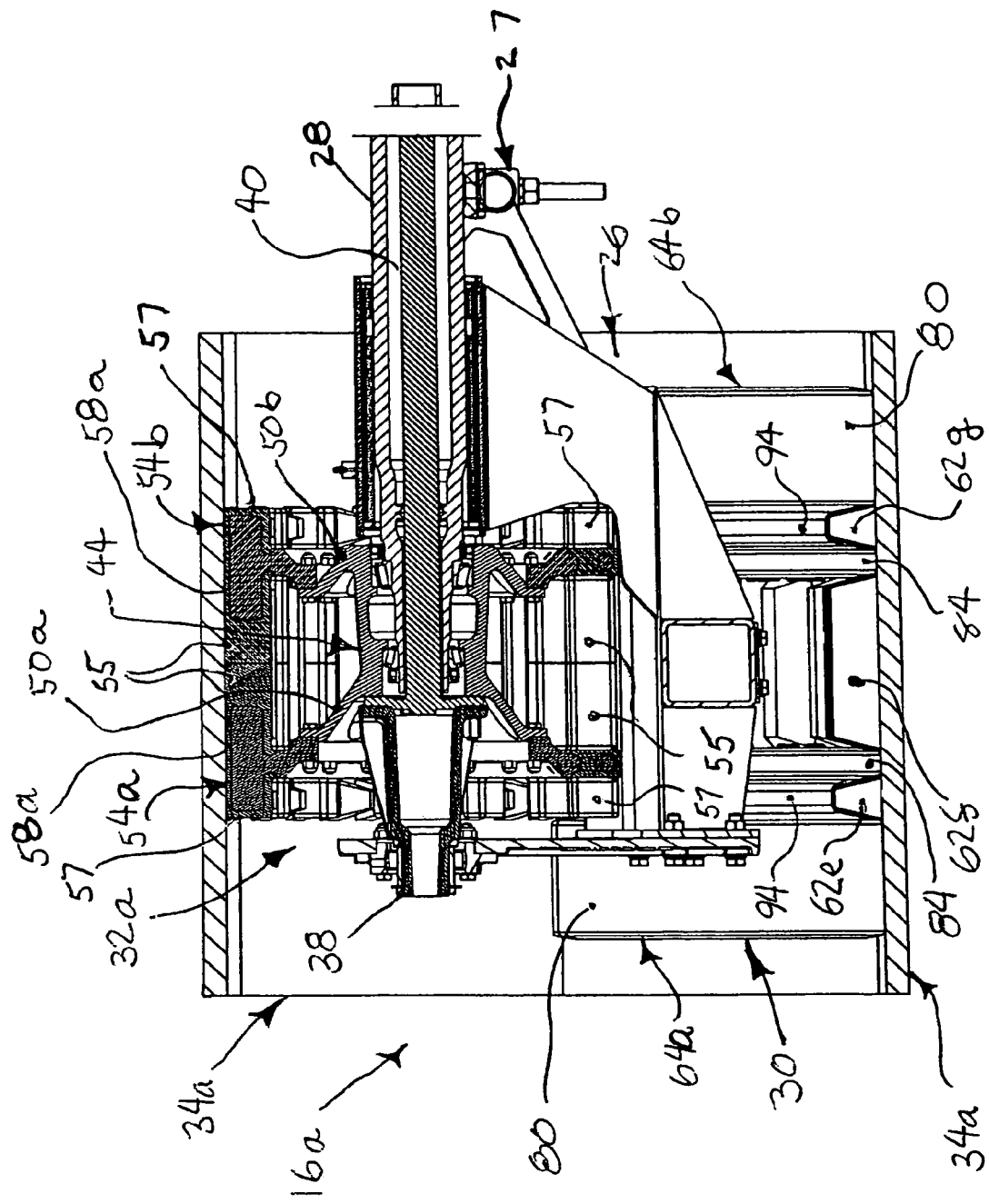
FIG. 5A is a view similar to FIG. 5, but showing an alternative embodiment of the drive sprocket wheel assembly and drive belt of the drive track unit of the invention.

Although the separate inside rows of drive lugs 62b and 62c are laterally spaced apart, these two inside rows could be combined, if desired, into a single continuous row of wide lugs as shown in FIG. 5A, to add a stiffening effect to drive belt 34. Also, although belt 34 has a smooth outer surface as previously described, it could be provided with traction bars or cleats molded into the belt and extending laterally across the outside of the belt, if desired for increased traction and especially if terrain disturbance is not a concern. Such a cleated belt is disclosed, for example, in the aforementioned U.S. Pat. No. 6,129,426, incorporated herein by reference.

Figure 6:
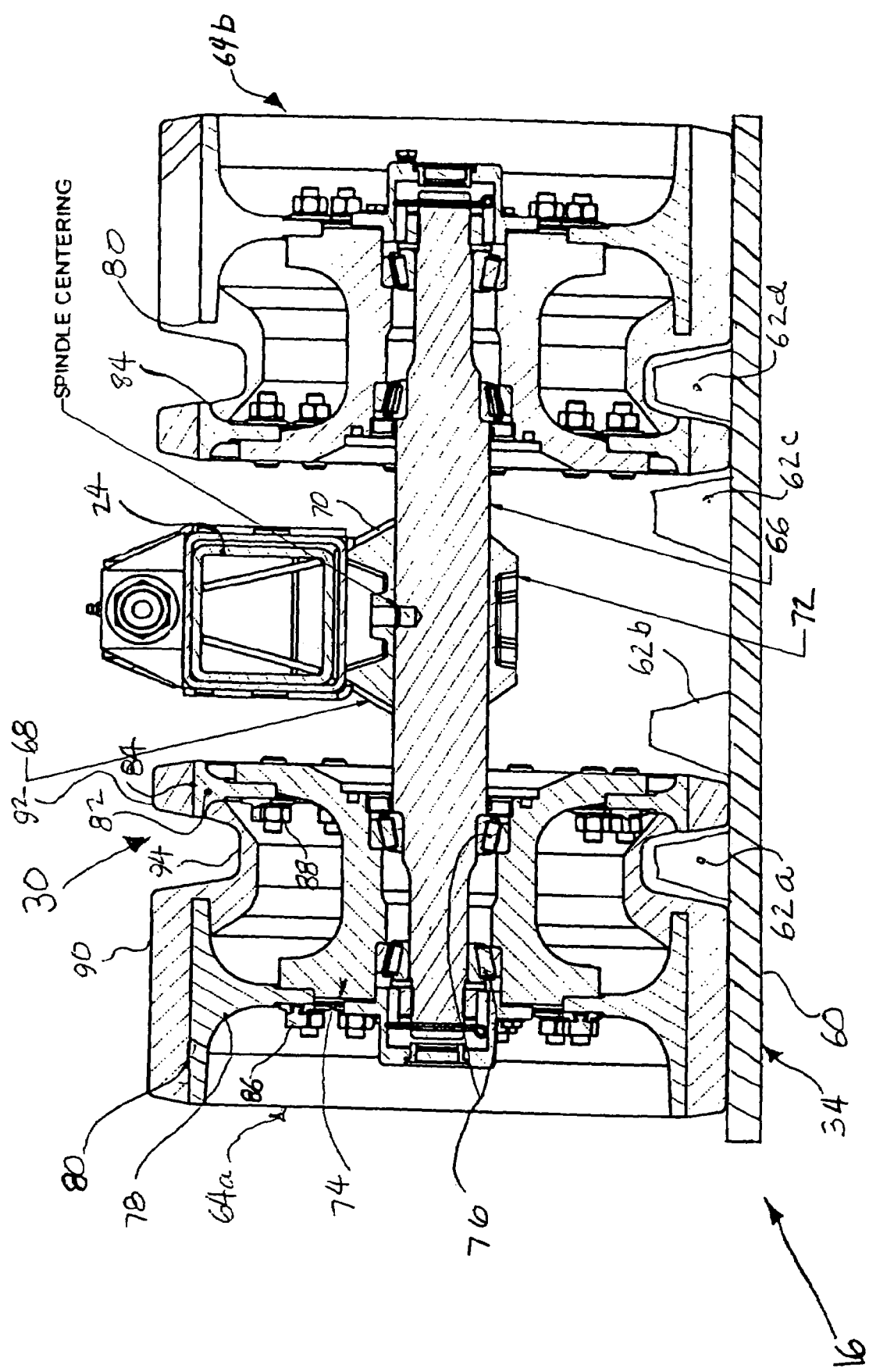
FIG. 6 is a vertical sectional view taken along the line 6—6 of FIG. 2 showing the details of construction of a guide wheel assembly and its mounting to the frame of the drive track unit.
Figure 7:
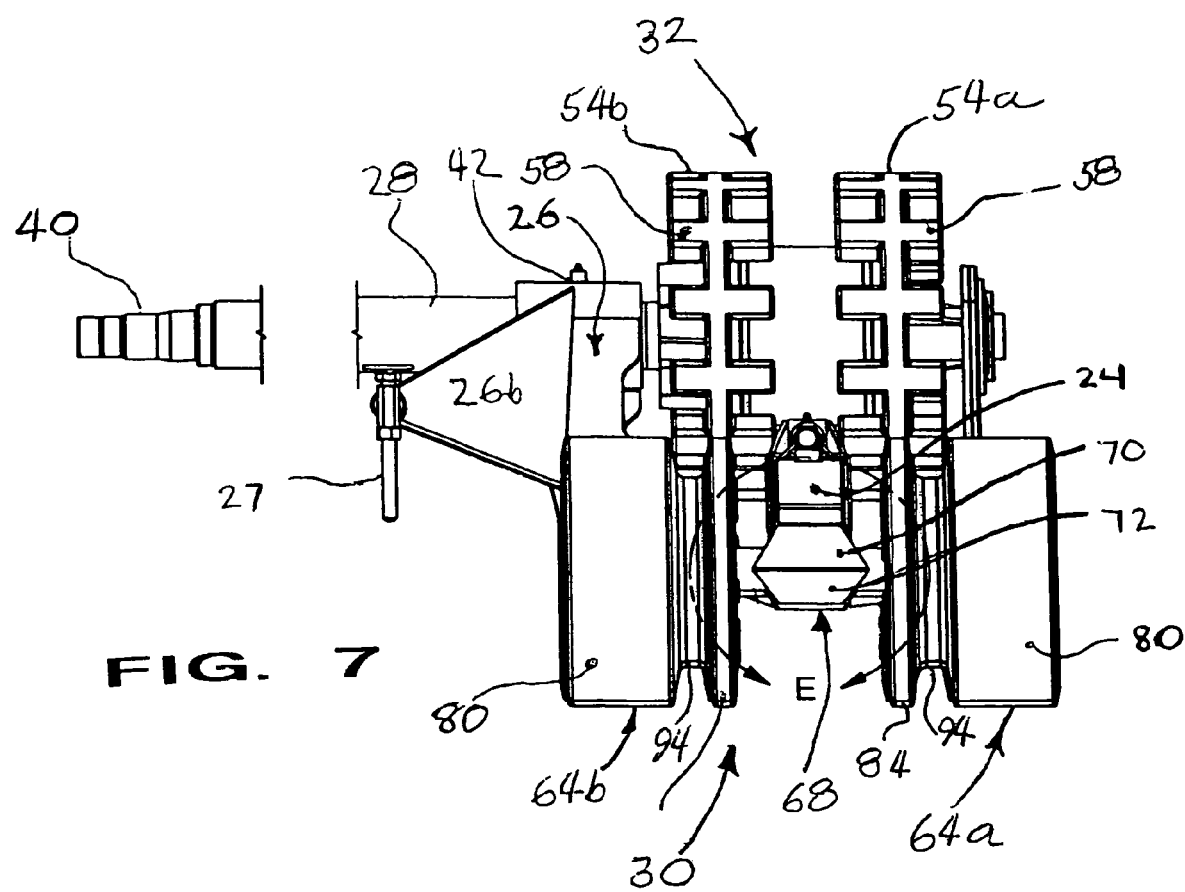
FIG. 7 is an elevational and partial sectional view of a guide wheel assembly of the invention taken along the line 7—7 of FIG. 3 showing how the wheel spindle of a guide wheel assembly is mounted to the carrier beam of a drive track unit.

Now referring especially to FIG. 6, each guide wheel assembly 30 along the lower track run, and therefore in engagement with drive belt 34, includes a pair of guide wheel units 64a, 64b, rotatably mounted at opposite end portions of a wheel spindle 66. The wheel spindle extends laterally a substantial distance beyond each of the opposite sides of carrier beam 24 such that the guide wheel units 64a, 64b are mounted one on each of the opposite sides of the carrier beam. Wheel spindle 66 is fixedly mounted to the carrier beam at the mid-portion of the spindle by a spindle clamp 68. As shown in FIG. 7, spindle clamp 68 includes an upper wheel spindle clamp seat 70 welded to carrier beam 24 and a spindle clamp cap 72 bolted to the clamp seat 70. Together, the spindle clamp and seat clamp wheel spindle 66 securely to the carrier beam. As will be apparent from FIG. 6 as well as FIGS. 4 and 5, the guide wheel assembly extends across substantially the full width of endless drive belt 34.

Each wheel unit 64a, 64b of guide wheel assembly 30 includes a wheel hub 74 rotatably mounted to an outer end portion of wheel spindle 66 on bearings 76. Attached to the axially opposite ends of hub 74 are a pair of axially spaced-apart rigid metal rings including an outer ring 78 having a wide rim 80 and an inner ring 82 having a much narrower outer rim 84. Each such ring is bolted to a flange portion of wheel hub 74 by bolts 86, 88. Each rim 80, 82 of a wheel unit is covered with an elastomeric outer covering including a wide outer covering 90 for the wide rimmed wheel ring 78 and a much narrower covering 92 for the narrow rimmed wheel ring 82. These outer coverings may be of a rubber or polyurethane material to provide cushioning between the wheel assembly and endless drive belt 34. The outer covering 90 of the wide rimmed wheel ring 78 extends inwardly and downwardly beyond wide wheel rim 80 into a gap between the wide and narrow rimmed wheel rings to define an annular groove 94 separating the wide and narrow wheel rings. As clearly shown in FIG. 6, groove 94 is sized to receive and allow clear passage of the outermost row of drive lugs 62a of belt 34.

The innermost wheel unit 64b is of identical size and construction to the wheel unit 64a such that the groove 94 of the inner wheel unit receives the innermost row of drive lugs 62d along the lower track run of belt 34.

It will also be noted that the spacing between outer wheel unit 64a and inner wheel unit 64b on wheel spindle 66 is such that the two wheel units are not only spaced laterally from carrier beam 24 to which they are mounted by the spindle, but are also spaced a sufficient distance apart to allow clear passage of the two central rows of drive lugs 62b, 62c. It will be apparent from FIG. 6 that, if desired, the two rows of lugs 62b, 62c can be combined to provide a single row of wide drive lugs. Such wide lugs would serve the same function as the two rows shown, but would also provide additional stiffening for the drive belt 34. It should also be noted that the four rows of drive lugs 62a–62d serve to resist any tendency of the drive belt 34 to shift laterally relative to the drive wheel assemblies. Thus, the drive lugs also serve as belt guide lugs.

From the foregoing, it will be apparent that each guide wheel assembly extends across substantially the full width of the drive belt 34, thereby preventing any substantial deflection of the belt relative to the guide wheel assemblies. Moreover, the pairs of guide wheel units of each guide wheel assembly, including their wide track support surfaces 90 and narrower track support surfaces 92 provided by the elastomer wheel unit coverings, actually engage and support the drive belt across substantially the full width of the belt except for the two annular grooves and spacing between wheel units that provide for unobstructed passage of the belt lugs. Accordingly, point loading of the belt and its attendant problems and disadvantages are substantially eliminated by the guide wheel assemblies of the present invention. Moreover, with such wide distribution of the vehicle load across the drive belt, the load is also distributed widely to the ground underlying the drive belt, thereby reducing substantially ground disturbance during vehicle travel. Furthermore, the wide distribution of the load across the drive belt to the ground improves traction and thereby, in many cases, should eliminate the need for traction cleats on the outer surface of the belt, further reducing ground disturbance.

In summary, both belt wear and ground disturbance should be reduced with the track units of the present invention because of the lighter weight of the drive wheel assemblies and better load distribution to the drive tracks of such units. Although the present invention has been described herein with reference to what are currently preferred embodiments thereof, it should be apparent to those skilled in the art that variations and modifications of the invention are possible without departing from the true spirit and scope of the present invention.

ALTERNATIVE PREFERRED EMBODIMENT

Referring to FIG. 5A, an alternative preferred embodiment of the drive track units 14–18, described with reference to FIGS. 1–7, includes the drive track unit 14a including a modified drive track belt 34a and modified drive wheel assembly 32a. Other major components of the drive track unit remain substantially unchanged and as heretofore described.

Drive track belt 34a includes three rows of integral drive lugs, including an outer row of lugs 62e, a middle row of lugs 62f, and an inner row of lugs 62g. The drive lugs 62e, 62g of the outer and inner rows are sized to fit within and pass freely through the annular grooves 94 of their respective outer and inner guide wheel units 64a, 64b. However, the lugs 62f of the middle row are much wider than the lugs 62e, 62g of the outer and inner rows. Lugs 62f are sized to span substantially the full distance between the outer and inner guide wheel units 64a, 64b of each guide wheel assembly.

The wide drive lugs serve two purposes. First, the wide lugs reinforce and add lateral stiffness to the belt to provide wear resistance and help maintain the belt in the track run. Second, the wide lugs, when coupled with drive sprocket cogs of corresponding length, as described below, provide a more efficient transmission of power from the drive sprocket wheel assembly 32a to the drive belt 34a by reducing point loading of the lugs, thereby reducing even further the possibility of track bounce and track jump, and their consequences, and also reducing track and sprocket wear.

Drive sprocket wheel assembly 32a is of the same general construction as previously described sprocket wheel assembly 32 as shown in FIG. 5. However, the sprocket wheels 54a, 54b of drive wheel assembly 32a are provided with drive cogs 58a having inward extensions 55 that extend inwardly from their respective sprocket wheels a greater distance than their outward extensions 57. The inward cog extensions 55 of the pair of sprocket wheels 54a, 54b meet midway between such sprocket wheels. Thus, the inward cog extensions 55 of each pair of sprocket wheels 54a, 54b drivingly engage the middle row of drive lugs 62f of drive belt 34a across the full width of such lugs, thereby reducing the point loading of the belt and therefore the possibility of track bounce and track jump.

Another feature of drive belt 34a is its greater width relative to the guide wheel assemblies 30, compared to the width of belt 34 relative to guide wheel assemblies 30 of FIG. 5. For example, whereas the widths of the guide wheel assemblies and belt in the embodiment of FIG. 5 may each be approximately twenty-six inches, the width of the wider belt 34a in FIG. 5A may be approximately thirty inches for the same twenty-six inch width of guide wheel assembly 30, with belt 34a extending approximately two inches beyond the inner and outer limits of the guide wheel assemblies. The extra wide belt 34a provides greater traction and less terrain disturbance than would a narrower belt. Such advantages can be achieved without sacrificing any appreciable belt stability because of the enhanced belt stability provided by the described wide guide wheel assemblies, wide belt drive lugs, and improved power transmission from the drive sprocket wheel assembly to the drive belt.

In summary, both belt wear and ground disturbance should be reduced with the track units of the present invention because of the lighter weight of the drive wheel assemblies and better load distribution to the drive tracks of such units. Although the present invention has been described herein with reference to what are currently preferred embodiments thereof, it should be apparent to those skilled in the art that variations and modifications of the invention are possible without departing from the true spirit and scope of the present invention.

I claim:

1. A track-driven all-terrain vehicle comprising:
   a vehicle body portion;
   multiple drive track units supporting the body portion;
   each of said drive track units including:
   a track frame, including a carrier beam extending longitudinally of said vehicle;
   a powered rotatable track drive wheel assembly supported on said frame;
   plural guide wheel assemblies mounted on said carrier beam and in spaced apart relationship along said beam;
   an endless track trained about said drive wheel assembly and said guide wheel assemblies and being drivingly engaged by said drive wheel assembly and supported during ground engagement by said guide wheel assemblies;
   each said guide wheel assembly including a wheel spindle fixedly mounted to said carrier beam and extending a substantial distance laterally inwardly and outwardly beyond said carrier beam, an outer guide wheel unit rotatably mounted on an outwardly extending portion of said wheel spindle, and an inner guide wheel unit rotatably mounted on an inwardly extending portion of said wheel spindle such that said outer and inner guide wheel units are axially spaced apart on opposite sides of the carrier beam and define the width of said assembly;

said endless track comprising a drive belt extending laterally beyond opposite sides of said carrier beam and having multiple laterally spaced-apart and circumferentially extending rows of drive lugs extending inwardly from an inner surface of said belt, said multiple rows including at least one row on each of the opposite sides of said carrier beam;

said drive wheel assembly comprising a sprocket wheel means including drive cogs for drivingly engaging drive lugs in all of said multiple rows simultaneously, including said rows on opposite sides of said carrier beam; and said inner and outer guide wheel units of said guide wheel assemblies each including outer track support surfaces that support substantially the full width of said drive belt except where said rows of drive lugs are positioned.

2. The vehicle of claim 1 wherein each said guide wheel assembly extends substantially the full width of said drive belt.

3. The vehicle of claim 1 wherein the width of each said guide wheel assembly is substantially equal to and coextensive with the width of said drive belt.

4. The vehicle of claim 1 wherein said outer guide wheel unit of said guide wheel assembly supports an outer edge portion of said drive belt.

5. The vehicle of claim 1 wherein said inner guide wheel unit of said guide wheel assembly supports an inner edge portion of said drive belt.

6. The vehicle of claim 1 wherein said multiple drive track units comprise four said units.

7. The vehicle of claim 6 wherein said drive wheel assembly and said guide wheel assemblies of each drive track unit support said drive belt in a generally triangular configuration with said drive wheel assembly at the apex of said configuration and said guide wheel assemblies spaced apart along the base of said configuration.

8. The vehicle of claim 7 wherein the width of each said guide wheel assembly is substantially equal to and coextensive with the width of said drive belt.

9. A vehicle according to claim 1 wherein said drive belt includes at least three rows of drive lugs, and said drive cogs drivingly engage a drive lug in each of said rows simultaneously.

10. A vehicle according to claim 9 wherein said at least three rows includes at least one row between the rows on opposite sides of the carrier beam.

11. A vehicle according to claim 1 wherein the width of each guide wheel assembly is substantially coextensive with the width of said drive belt.

12. A vehicle according to claim 1 wherein at least the forwardmost and rearwardmost guide wheel assemblies of said multiple guide wheel assemblies each has an overall width that is substantially coextensive with the width of said drive belt.

13. The vehicle of claim 1 wherein each of said inner and outer guide wheel units of each guide wheel assembly is provided with an annular belt-engaging surface and an annular groove sized to permit passage therethrough of one of said rows of lugs and to maintain lateral alignment of said belt with said guide wheel assemblies.

14. A vehicle according to claim 1 wherein said sprocket wheel means of said drive wheel assembly includes a pair of axially spaced apart sprocket wheels, each including cogs drivingly engaging a different one of said at least one row of drive lugs.

15. A vehicle according to claim 14 wherein the cogs of each one of said pair of sprocket wheels drivingly engage said lugs of at least two of said multiple rows simultaneously.

16. A vehicle according to claim 1 wherein all said guide wheel units of all said plural guide wheel assemblies are of the same size and configuration.

17. A vehicle according to claim 16 wherein said multiple drive track units comprise four said drive track units, each said drive track unit including four said guide wheel assemblies, each of said guide wheel assemblies including two said guide wheel units, and the guide wheel units of all said guide wheel assemblies of all said drive track units being of the same size and configuration, such that the guide wheel units of all said guide wheel assemblies are interchangeable.

18. A vehicle according to claim 17 wherein each said guide wheel unit includes an annular belt-engaging surface and an annular groove subdividing said annular surface into laterally outer and inner surface portions, said annular groove being sized to permit passage therethrough of one of said rows of lugs and to maintain lateral alignment of said belt with said guide wheel assemblies.

19. A vehicle according to claim 18 wherein said outer surface portion of each said guide wheel unit is wider than said inner surface portion.

20. The vehicle of claim 1 wherein each drive track unit includes a drive axle, and each said drive wheel assembly includes a unitary one-piece drive axle hub and sprocket drum directly and drivingly connected to said drive axle and to said sprocket wheel means.

21. The vehicle of claim 20 wherein said sprocket wheel means includes multiple sprocket wheels mounted in axially spaced-apart relationship on said sprocket drum.

22. The vehicle of claim 21 wherein said multiple sprocket wheels comprise a pair of drive sprocket wheels directly and drivingly connected to opposite end portions of said unitary hub and drum.

23. The vehicle of claim 22 wherein each said sprocket wheel includes circumferentially spaced-apart drive cogs extending laterally from opposite sides of the sprocket wheel for drivingly engaging substantially the full widths of said drive lugs in said multiple rows.

24. A track-driven all-terrain vehicle comprising:
a vehicle body portion;
multiple drive track units supporting the body portion;
each of said drive track units including:
a track frame, including a carrier beam extending longitudinally of said vehicle;
a powered rotatable track drive wheel assembly supported on said frame;
plural guide wheel assemblies mounted on said carrier beam and in spaced apart relationship along said beam;
an endless track trained about said drive wheel assembly and said guide wheel assemblies and being drivingly engaged by said drive wheel assembly and supported during ground engagement by said guide wheel assemblies;
each said guide wheel assembly including a wheel spindle fixedly mounted to said carrier beam and extending laterally inwardly and outwardly beyond said carrier beam, an outer guide wheel unit rotatably mounted on an outwardly extending portion of said wheel spindle, and an inner guide wheel unit rotatably mounted on an inwardly extending portion of said wheel spindle such that said outer and inner guide wheel units are axially spaced apart on opposite sides of the carrier beam and define the width of said assembly;

said multiple drive track units comprising four said units;

said drive wheel assembly and said guide wheel assemblies of each drive track unit supporting said endless track in a generally triangular configuration with said drive wheel assembly at the apex of said configuration and with said guide wheel assemblies spaced apart along the base of said configuration;

said drive track comprising a drive belt including an inner surface having multiple circumferentially extending rows of drive lugs extending inwardly therefrom, and said drive wheel assembly including multiple spaced-apart sprocket wheels including laterally extending drive cogs for drivingly engaging simultaneously drive lugs in all of the said rows of drive lugs; and said multiple rows of drive lugs including at least one row positioned on each of the opposite sides of said carrier beam.

25. The vehicle of claim 24 wherein said drive belt includes a smooth outer ground-engaging surface.

26. The vehicle of claim 24 wherein said guide wheel assemblies and said drive belt are substantially coextensive in width.

27. The vehicle of claim 24 wherein said drive belt extends outwardly of the laterally outer limits of said guide wheel assemblies.

28. The vehicle of claim 24 wherein said multiple rows of drive lugs include a single row of drive lugs positioned between said inner and outer guide wheel units of said guide wheel assemblies, the width of the lugs of said single row being substantially coextensive with the spacing between said inner and outer wheel units.

29. The vehicle of claim 28 wherein said drive cogs include cog portions that drivingly engage substantially the full width of the lugs of said single row.

30. The vehicle of claim 24 wherein each drive track unit includes a drive axle, and each said drive wheel assembly includes a unitary one-piece drive axle hub and sprocket drum directly and drivingly connected to said drive axle, said multiple spaced-apart sprocket wheels being mounted in axially spaced-apart relationship on said one-piece drive axle hub and sprocket drum.

31. A track-driven all-terrain vehicle comprising:
a vehicle body portion;
multiple drive track units supporting the body portion;
each of said drive track units including;
a track frame, including a carrier beam extending longitudinally of said vehicle;
a powered rotatable track drive wheel assembly supported on said frame;
plural guide wheel assemblies mounted on said carrier beam and in spaced apart relationship along said beam;
an endless track trained about said drive wheel assembly and said guide wheel assemblies and being drivingly engaged by said drive wheel assembly and supported during ground engagement by said guide wheel assemblies;
each said guide wheel assembly including a wheel spindle fixedly mounted to said carrier beam and extending laterally inwardly and outwardly beyond said carrier beam, an outer guide wheel unit rotatably mounted on an outwardly extending portion of said wheel spindle, and an inner guide wheel unit rotatably mounted on an inwardly extending portion of said wheel spindle such that said outer and inner guide wheel units are axially spaced apart on opposite sides of the carrier beam and define the width of said assembly;

said multiple drive track units comprising four said units;

said drive wheel assembly and said guide wheel assemblies of each drive track unit supporting said endless track in a generally triangular configuration with said drive wheel assembly at the apex of said configuration and with said guide wheel assemblies spaced apart along the base of said configuration;

said drive track comprising a drive belt including an inner surface having multiple circumferentially extending rows of drive lugs extending inwardly therefrom, and said drive wheel assembly includes multiple spaced-apart sprocket wheels including laterally extending drive cogs for drivingly engaging the said rows of drive lugs; and each of said inner and outer guide wheel units of each guide wheel assembly being provided with an annular belt-engaging surface and an annular groove sized to permit passage therethrough of one of said rows of lugs and to maintain lateral alignment of said belt with said guide wheel assemblies.

32. A track-driven all-terrain vehicle comprising:
a vehicle body portion;
multiple drive track units supporting the body portion;
each of said drive track units including;
a track frame, including a carrier beam extending longitudinally of said vehicle;
a powered rotatable track drive wheel assembly supported on said frame;
plural guide wheel assemblies mounted on said carrier beam and in spaced apart relationship along said beam;
an endless track trained about said drive wheel assembly and said guide wheel assemblies and being drivingly engaged by said drive wheel assembly and supported during ground engagement by said guide wheel assemblies;
each said guide wheel assembly including a wheel spindle fixedly mounted to said carrier beam and extending laterally inwardly and outwardly beyond said carrier beam, an outer guide wheel unit rotatably mounted on an outwardly extending portion of said wheel spindle, and an inner guide wheel unit rotatably mounted on an inwardly extending portion of said wheel spindle such that said outer and inner guide wheel units are axially spaced apart on opposite sides of the carrier beam and define the width of said assembly;

said drive wheel assembly and said guide wheel assemblies of each drive track unit supporting said endless track in a generally triangular configuration with said drive wheel assembly at the apex of said configuration and with said guide wheel assemblies spaced apart along the base of said configuration;

said drive track comprising a drive belt including an inner surface having multiple circumferentially extending rows of drive lugs extending inwardly therefrom, and said drive wheel assembly including multiple spaced-apart sprocket wheels having drive cogs for drivingly engaging simultaneously drive lugs in all of said multiple rows; and said multiple rows of drive lugs including at least one outer row positioned laterally outwardly of said carrier beam, at least one inner row positioned laterally inwardly of said carrier beam, and at least one row positioned between said outer and inner rows.

33. The vehicle of claim 32 wherein said drive belt includes a smooth outer ground-engaging surface.

34. The vehicle of claim 32 wherein each drive track unit includes a drive axle, and each said drive wheel assembly includes a unitary one-piece drive axle hub and sprocket drum directly and drivingly connected to said drive axle, said multiple spaced-apart sprocket wheels being mounted in axially spaced-apart relationship on said one-piece drive axle hub and sprocket drum.

35. A track-driven all-terrain vehicle comprising:
a vehicle body portion;
multiple drive track units supporting the body portion;
each of said drive track units including;
a track frame, including a carrier beam extending longitudinally of said vehicle;
a powered rotatable track drive wheel assembly supported on said frame;
plural guide wheel assemblies mounted on said carrier beam and in spaced apart relationship along said beam;
an endless track trained about said drive wheel assembly and said guide wheel assemblies and being drivingly engaged by said drive wheel assembly and supported during ground engagement by said guide wheel assemblies;
each said guide wheel assembly including a wheel spindle fixedly mounted to said carrier beam and extending laterally inwardly and outwardly beyond said carrier beam, an outer guide wheel unit rotatably mounted on an outwardly extending portion of said wheel spindle, and an inner guide wheel unit rotatably mounted on an inwardly extending portion of said wheel spindle such that said outer and inner guide wheel units are axially spaced apart on opposite sides of the carrier beam and define the width of said assembly;
said drive wheel assembly and said guide wheel assemblies of each drive track unit supporting said endless track in a generally triangular configuration with said drive wheel assembly at the apex of said configuration and with said guide wheel assemblies spaced apart along the base of said configuration; and
said drive track comprising a drive belt including an inner surface having multiple circumferentially extending rows of drive lugs extending inwardly therefrom, and said drive wheel assembly includes multiple spaced-apart sprocket wheels including laterally extending drive cogs for drivingly engaging the said rows of drive lugs;
each of said inner and outer guide wheel units of each guide wheel assembly being provided with an annular belt-engaging surface and an annular groove sized to permit passage therethrough of one of said rows of lugs and to maintain lateral alignment of said belt with said guide wheel assemblies.

36. The vehicle of claim 35 wherein said guide wheel assemblies and said drive belt are substantially coextensive in width.

37. The vehicle of claim 35 wherein said drive cogs include cogs drivingly engaging lugs in all of said rows simultaneously.

* * * * *